W. R. WHITNEY.
ARC LAMP.
APPLICATION FILED NOV. 16, 1903.
915,052.
Patented Mar. 9, 1909.
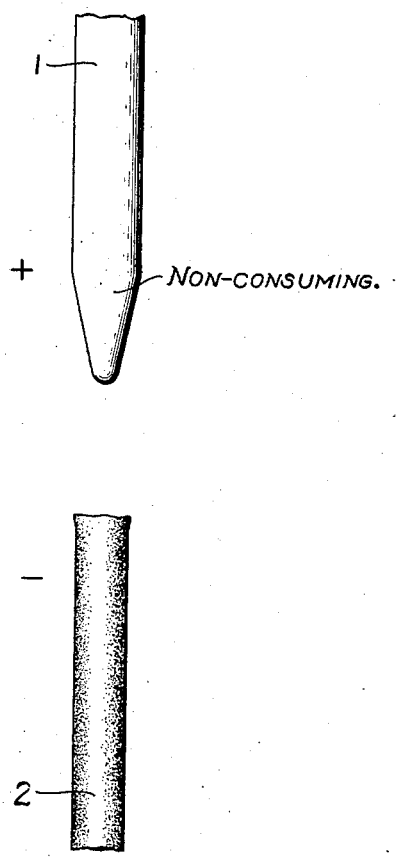
Witnesses:
George A. Thornton
Helen Orford
Inventor:
Willis R. Whitney,
by Albert G. Davis,
Att'y.

UNITED STATES PATENT OFFICE.

WILLIS R. WHITNEY, OF BOSTON, MASSACHUSETTS, ASSIGNOR TO GENERAL ELECTRIC COMPANY, A CORPORATION OF NEW YORK.

ARC-LAMP.

No. 915,052.    Specification of Letters Patent.    Patented March 9, 1909.

Application filed November 16, 1903. Serial No. 181,308.

*To all whom it may concern:*

Be it known that I, WILLIS R. WHITNEY, a citizen of the United States, residing at Boston, county of Suffolk, State of Massachusetts, have invented certain new and useful Improvements in Arc-Lamps, of which the following is a specification.

In the operation of the ordinary direct-current arc lamp employing carbon electrodes the arc end of the positive electrode becomes very highly heated and the electrode very rapidly consumes, as is well known to those skilled in the art. In fact, in direct-current arc lamps in which carbon electrodes are employed the major portion of the illumination furnished by the lamp comes from an incandescent crater formed in the end of the positive electrode. The heat necessary to obtain this incandescent crater is great enough to cause rapid combustion of the electrode as well as to volatilize the material itself. I have found, however, that with many substances which give what is known as a flaming or luminous arc in which the major portion of the illumination coming from the lamp is furnished by the arc, thus obviating the necessity for incandescent positive electrodes, it is not essential for the proper operation of the lamp that the positive electrode should be consumed under the action of the arc, since the negative electrode furnishes the necessary material required to maintain the arc. In particular I have found that where the negative electrode is made of or contains titanium carbid, magnetic oxid of iron, or many other materials, a positive electrode constructed and arranged so that it will not be consumed by the heat of the arc can be advantageously employed. The positive electrode employed with such a negative may be made out of some metal such as copper or other conducting material which is not too readily oxidized.

It has been found desirable that the non-consuming electrode be constructed so that the heat generated by the arc will maintain it at a certain temperature which is below that of oxidation of the material employed, but which is high enough to prevent the electrode from becoming too good a condenser for the products of combustion of the arc. This result may be obtained with many different forms and arrangements of the positive electrode.

For a better understanding of my invention reference may be had to the accompanying drawing in which I have illustrated one embodiment of my invention.

Referring to the drawings, 1 represents the upper positive electrode formed out of some material such as copper which is a good conductor of electricity and which is not consumed, except perhaps in a very slight degree due to slow oxidation. The lower electrode 2 is formed of or contains some material such as magnetic oxid of iron or titanium carbid which yields a flaming or luminous arc.

It will, of course, be understood that electrodes differing in shape, arrangement and composition from those illustrated in the drawing and described in the specification could be employed, as I do not intend that my present invention shall be limited in all its aspects to any particular construction or arrangement of electrodes as I consider my invention to consist, broadly, in a non-consuming positive electrode in combination with a negative electrode which in consuming yields up the necessary gases or vapor to maintain the arc.

What I claim as new and desire to secure by Letters Patent of the United States, is,—

1. In an arc lamp, a non-consuming positive electrode, in combination with a negative electrode which in consuming yields up the necessary gases or vapor to maintain the arc.

2. In a lamp, a non-consuming positive electrode, in combination with a negative consuming electrode giving a flaming or luminous arc.

3. In an arc lamp, a non-consuming positive electrode, in combination with a negative consuming electrode containing a considerable proportion of an oxid.

4. In an arc lamp, a non-consuming positive electrode, in combination with a negative electrode containing magnetic oxid of iron.

5. In an arc lamp, a negative consuming electrode giving a flaming or luminous arc, and a non-consuming positive electrode formed out of some good conducting but not readily oxidizable metal.

6. In a lamp, a positive non-consuming electrode, in combination with a negative consuming electrode giving a flaming or luminous arc, both of said electrodes being solids.

7. In an arc lamp, an upper non-consuming positive electrode in combination with a negative electrode giving a flaming or luminous arc and which in consuming yields up the necessary gases or vapor to maintain the arc.

8. In an arc lamp, a non-consuming positive electrode formed out of copper in combination with a negative electrode which in consuming yields up the necessary gases or vapor to maintain the arc.

9. In an arc lamp, a positive metal electrode, in combination with a negative consuming electrode giving a flaming or luminous arc.

10. In an open air arc lamp, the combination of a negative electrode which in consuming yields the necessary gases or vapor to maintain the arc, with a positive electrode constructed to be maintained at a temperature below that of oxidation of the electrode material.

In witness whereof, I have hereunto set my hand this 13th day of November, 1903.

WILLIS R. WHITNEY.

Witnesses:
 BENJAMIN B. HULL,
 HELEN ORFORD.